United States Patent
Berglund et al.

(10) Patent No.: US 7,235,034 B2
(45) Date of Patent: Jun. 26, 2007

(54) METHOD FOR CONTROLLING THE ADJUSTMENT OF THE VALVES IN A COMBUSTION ENGINE WITH VARIABLE VALVES AND A VEHICLE WITH SUCH AN ENGINE WITH ELECTRONIC CONTROLLING DEVICE FOR THE VALVE CONTROL

(75) Inventors: Sixten Berglund, Torslanda (SE); Anders Eriksson, Gothenburg (SE); Marcus Steen, Angered (SE); Soren Udd, Nodinge (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/164,948

(22) Filed: Dec. 12, 2005

(65) Prior Publication Data
US 2006/0199699 A1   Sep. 7, 2006

Related U.S. Application Data

(63) Continuation of application No. PCT/SE2004/000881, filed on Jun. 7, 2004.

(30) Foreign Application Priority Data
Jun. 12, 2003   (SE)   .................................... 0301714

(51) Int. Cl.
*F01L 1/34*   (2006.01)

(52) U.S. Cl. ..................................... 477/107; 123/90.15

(58) Field of Classification Search ............. 123/90.11, 123/90.15; 477/107
See application file for complete search history.

(56) References Cited

U.S. PATENT DOCUMENTS

| 2,670,595 | A |   | 3/1954 | Miller |
| 5,097,808 | A | * | 3/1992 | Tanaka et al. ......... 123/339.11 |
| 5,228,422 | A | * | 7/1993 | Wakeman .................... 123/432 |
| 6,098,005 | A |   | 8/2000 | Tsukamoto et al. |
| 6,951,211 | B2 | * | 10/2005 | Bryant ..................... 123/559.1 |

FOREIGN PATENT DOCUMENTS

WO    WO 95/04210    *    2/1995

* cited by examiner

*Primary Examiner*—Ha Ho
(74) *Attorney, Agent, or Firm*—Novak Druce + Quigg, LLP

(57) ABSTRACT

Method and arrangement for providing a vehicle having a combustion engine (1) with valves (7, 8) adapted to have variable valve timing and/or valve lift height. The valves are provided with operating devices (9,10) that are controlled by electronic controlling devices (3), which are arranged, while the vehicle is being driven, with the aid of entered information about at least the gradient of the road and the throttle position, to calculate future resistance to forward motion and the period of time to a future transient in the engine's operating condition, for example in association with a future change of engine operating mode and/or a future gear change in a gearbox (2) connected to the engine. The controlling devices are arranged to control valve timing and/or the valve lift height during the period of time for optimization of the engine's performance, once the transient has arisen.

21 Claims, 2 Drawing Sheets

METHOD FOR CONTROLLING THE ADJUSTMENT OF THE VALVES IN A COMBUSTION ENGINE WITH VARIABLE VALVES AND A VEHICLE WITH SUCH AN ENGINE WITH ELECTRONIC CONTROLLING DEVICE FOR THE VALVE CONTROL

CROSS-REFERENCE TO RELATED APPLICATIONS

The present application is a continuation patent application of International Application No. PCT/SE2004/000881 filed 7 Jun. 2004 which is published in English pursuant to Article 21(2) of the Patent Cooperation Treaty, and which claims priority to Swedish Application No. 0301714-2 filed 12 Jun. 2003. Said applications are expressly incorporated herein by reference in their entireties.

FIELD OF THE INVENTION

The present invention relates to a method, in a vehicle with a combustion engine, that has at least an inlet valve and at least an exhaust valve on each combustion chamber, and at least one of which has variable valve timing and/or valve lift height, for regulating said valve's timing and/or valve lift height while the vehicle is being driven.

The invention also relates to a vehicle with a combustion engine that has at least an inlet valve and at least an exhaust valve on each combustion chamber, and at least one of which has operating devices for varying the opening time and/or lift height of the valves, and electronic controlling devices that control said operating devices.

The present invention also relates to a computer program for carrying out such a control method using a computer.

BACKGROUND OF THE INVENTION

The equipping of combustion engines with mechanisms that make it possible to vary the opening and closing of the valves both with regard the length of the period of opening and its position in relation to the crankshaft angle, and that also make it possible to vary the lift height of the valves is already known. A mechanism can be arranged to vary the valve timing and the lift heights for all the inlet valves simultaneously, while another can be arranged to vary the valve timing and the lift heights for all the exhaust valves simultaneously. Recently, however, mechanisms have been developed that make it possible to regulate each valve individually with regard to valve timing and lift height. By continually regulating the valve timing and the valve lift height to suit the engine's operating conditions while the vehicle is being driven, better efficiency, increased life of components, better performance (for example with regard to emissions), better response (power performance), and better handling can be attained than for a comparable engine with non-variable valve timing and/or valve lift heights.

It is common to all such previously-known regulation that the adjustment of the valves is instantaneous and internal in the engine, which means that it can not predict and take into account future transients in the engine's operating condition. Such transients are, for example, gear changes in the vehicle's gearbox or in association with a general increase/reduction in torque or in association with connection/disconnection of engine braking when going downhill. Even though the actual valve adjustment for matching a new operating condition can be carried out very quickly with modern equipment, the large volumes, particularly in the pipe systems of turbocharged engines on the inlet side, and the inertia in the turbo unit have meant that, to date, delays in the adjustment to the operating condition have not been able to be avoided. For example, delays of up to three to four seconds have not been uncommon, which has a negative effect on the engine's emissions, response, efficiency and handling.

SUMMARY OF THE INVENTION

An aim of the present invention is to achieve a method for controlling the adjustment of the valves in an engine that has variable valves so that changes in the valve timing and/or lift height of the valves can be matched in advance to a future course of events instead of, as at present, only being controlled instantaneously and internally in the engine.

This is achieved according to the invention by the vehicle's future resistance to forward motion being calculated, by the period of time until a future transient in the engine's operating condition being calculated and by requisite adjustments of valve timing and/or valve lift heights being carried out during this period of time for optimization of the engine's performance, when the transient arises.

With variable valve timing, there is the ability to operate the engine in different operating modes in different driving conditions, for example Miller cycle (see for example U.S. Pat. No. 2,670,595) and normal Diesel cycle. During the changeover from one operating mode to a second operating mode, unwanted delays arise. From the time that the changeover from one mode commences, there is a delay of a certain period of time until the changeover to the second mode is completed. The delay is caused, as mentioned above, primarily by the gas volumes in the engine's pipe system on the inlet side, but also by the inertia in the turbo unit, if the engine is equipped with such a unit. By controlling the valve setting in advance, according to the invention, so that, for example, before going up a steep hill, there is a changeover from the engine operating according to the Miller cycle to the engine operating according to normal Diesel cycle, the changeover to the Diesel cycle can be completed before the vehicle starts to go up the hill. In this way, any disturbances in the operation of the engine can be avoided, which disturbances can arise when there is a simultaneous change of mode and greater increase in torque in association with the vehicle starting to climb up the hill. By means of the engine being changed to the Diesel cycle before the vehicle starts to go up the hill, the driver experiences a better response once the vehicle has started to climb the hill and when the torque is increased in order to cope with the gradient of the hill and maintain the vehicle's speed.

In addition, in the event of an increase in torque, low internal exhaust recirculation is required. This can be achieved by a small overlap between the inlet valves and the exhaust valves. By controlling the valve adjustment in advance, according to the invention, so that, for example, when changing gear, a valve adjustment to a smaller valve overlap is carried out in the event of an increase in torque after the gear change, negative pressure ratio across the engine can be avoided, that is higher pressure on the exhaust side than on the inlet side, which arises in a turbocharged engine in the event of an increase in torque in association with the gear change, does not result in an unwanted internal exhaust recirculation.

A matching of valve timing in good time before a transient also has a positive effect on engine compression braking that can be carried out in association with changing up a gear in an engine with a compression braking device.

The invention is based on electronically controlling devices which control the valve adjustment, and upon having information about when a future transient, for example change of gear and/or change in engine operating mode, will take place. The basis for this information is information about future changes in the vehicle's resistance to forward motion. The invention is based accordingly on the technology that is described in patent application SE 0103629-2. Controlling devices are here arranged to select when a future gear change is to take place according to a selected gear change strategy, utilizing input parameters and hence knowledge of at least the gradient of the road and the vehicle's throttle position, and possibly also comprising engine, turbo and transmission characteristics. Information about future resistance to forward motion for this purpose can be obtained using GPS-equipment and electronic maps with stored information about the topography of the surroundings. For a more detailed description of the technology for the vehicle's identification of its surroundings, refer to the abovementioned patent application.

A motor vehicle of the type mentioned in the introduction is characterized according to the invention in that the controlling devices are arranged to calculate future resistance to forward motion and the period of time to a future transient in the engine's operating condition while the vehicle is being driven, with the aid of information about at least the gradient of the road and throttle position, and to control said operating devices during said period of time for increased level of optimization of the engine's performance, once the transient has arisen.

BRIEF DESCRIPTION OF THE DRAWINGS

The invention is described in greater detail with reference to embodiments shown in the accompanying drawings, in which.

DETAILED DESCRIPTION

Figure 1:
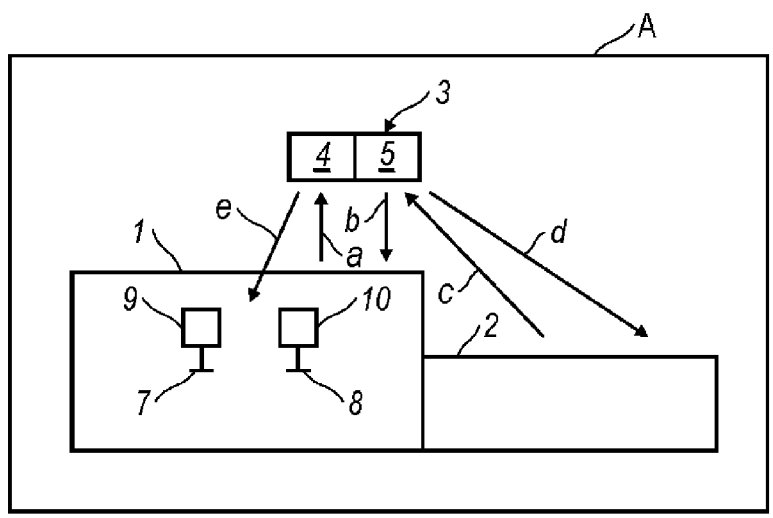
FIG. 1 shows a schematic illustration of a drive unit in a motor vehicle.

In FIG. 1, a combustion engine 1 is designated in a vehicle A, to which a transmission 2 is connected in such a way that it is driven by the engine. The engine 1 and the transmission 2 are controlled by an electronic control unit 3, comprising (including, but not necessarily limited to) an engine control part 4 and a transmission control part 5, each of which communicates with the other. The control can be carried out according to the model that is described in the abovementioned SE 0103629-2 and is symbolized by the arrows "a" and "b" for the engine control and by "c" and "d" for the transmission control.

The engine 1 can be of the multi-cylinder type, for example six-cylinder, Otto cycle or diesel engine, with or without a supercharging system (turbo unit), and with single or double inlet and exhaust valves for each cylinder. In FIG. 1, an inlet valve 7 and exhaust valve 8 are schematically represented with respect to an engine cylinder. Each valve 7 and 8 is provided with electronically controlled individual operating devices 9 and 10 respectively, for example electromagnets, by means of which the valves are opened and closed in response to signals from the control unit 3 that is symbolized by the arrow "e". By means of the control unit 3 and the operating devices 9 and 10, the valves can be controlled individually and completely freely; that is, the opening and closing of each valve can be varied freely both with regard to the length of the period of opening and the position in relation to the crankshaft angle in order to make possible completely free variation of the valve overlap of the inlet valves and the exhaust valves. When necessary, the maximal lift height of the respective valves can also be varied as required. The control unit 3 can be programmed to carry out opening or closing of a valve in a relatively short time (instantaneous or step-by-step instantaneous) or in a relatively long time (gradually).

Figure 2:
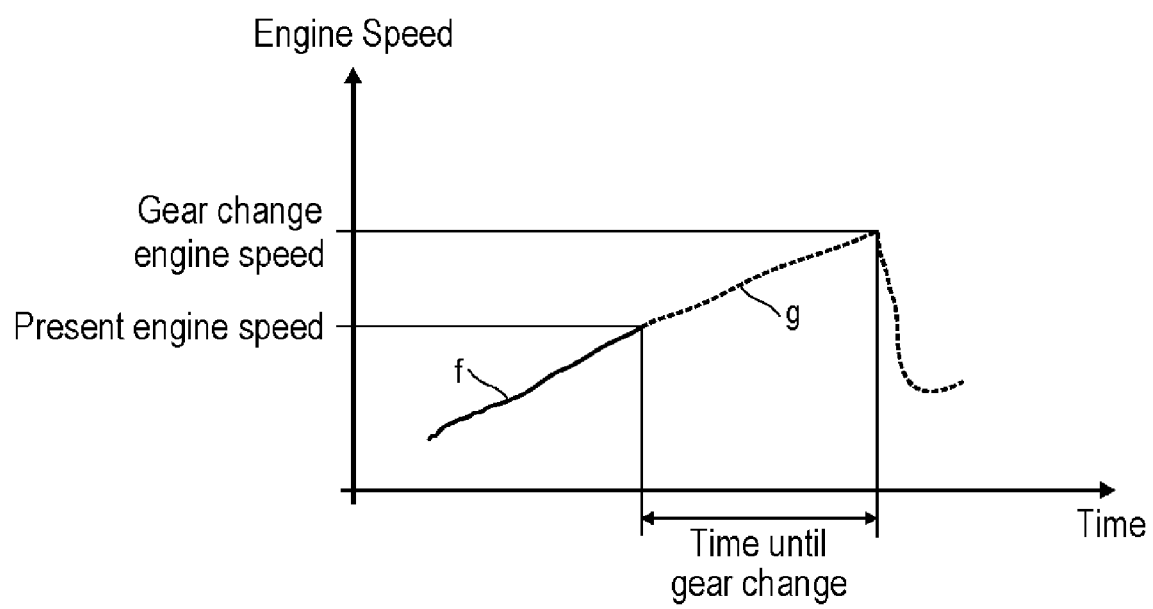
FIG. 2 shows a diagram of a simulation of the vehicle's driving characteristics in association with an upward gear change.

In the control unit 3, the vehicle's driving characteristics are stored in the form of the increase in engine speed as a function of the time, which is marked in FIG. 2 by the solid curve "f". Future resistance to forward motion and the period of time from the current engine speed to an engine speed at which the next gear change in the transmission 2 is calculated to take place, which in FIG. 2 is marked by a broken projection "g" of the curve "f", can be simulated utilizing information about the engine torque required by the driver (throttle position or cruise control setting) and information from, for example, GPS-equipment with electronic maps with stored topography. For a more detailed description of how the vehicle's driving characteristics can be simulated on the basis of models, refer to the abovementioned SE 0103629-2.

Within the period of time marked in FIG. 2, during a change of gear the control unit 3 causes the operating devices 9, 10 to regulate the valve control, so that the engine is adjusted to suit its new operating condition when the gear change procedure is commenced and the engine torque is reduced. Before the gear change procedure is commenced, the control unit 3 commences and possibly completes (depending upon the programming) requisite preparations (adjustment to a smaller valve overlap) for the subsequent increase in torque, so that optimal response is obtained during the increase. By optimal response, it is meant that a change in the engine torque-decrease or increase in torque-requested by the driver of the vehicle takes place with the smallest possible delay; that is, expressed simply, response means a rapid increase in torque in both a positive (driving) and a negative (braking) direction.

If the engine is equipped with a compression braking device, which is arranged to be activated automatically in the event of an upward change of gear in order to rapidly reduce the engine speed, the control unit 3 causes the operating devices 9, 10 to regulate the valve control during said period of time during upward change of the gear in the gearbox for optimizing of the engine braking torque. Such a compression braking device can be of the type that is illustrated and described in EP 0458857 B1, to which reference should be made for a more detailed description and function of a compression brake.

A transient can mean that a change of engine operating mode must be carried out in order to optimize the performance of the engine. According to an embodiment of the invention, the vehicle's driving characteristics are stored in the control unit 3 in the form of the increase in engine speed as a function of the time. With information about the engine torque (throttle position or cruise control setting) required by the driver and information from, for example, GPS-equipment with electronic maps with stored topography, future resistance to forward motion and the period of time from the current engine speed to an engine speed at which the next transient with change of engine operating mode is calculated to take place can be simulated. With knowledge of said period of time, the change of engine operating mode can be commenced in good time before the end of the time period so that the change of mode can be completed before the end of the period of time and before the transient occurs. Thus the control unit 3 makes the requisite adjustments of the valve control (valve timing and/or valve lift height) for the change of mode during said period of time and in this way the response of the engine in particular is increased.

Thus, according to the invention, the control unit 3 commences the adjustment of at least valve timing by a certain predetermined time before a certain predicted transient is calculated to occur. The predetermined time is dependent upon the type of transient and the current vehicle conditions and predicted vehicle conditions; that is, vehicle conditions in association with the predicted transient.

In an alternative embodiment of the invention, the change of mode can at least be commenced before the transient arises. Thus the change of mode can not be completed until during the transient or immediately after the transient. Requisite adjustments of the valve control can be completed before said period of time is completed. The actual change of mode is, however, delayed on account of the abovementioned inertia in the engine 1, for example in the engine's inlet system.

Figure 3:
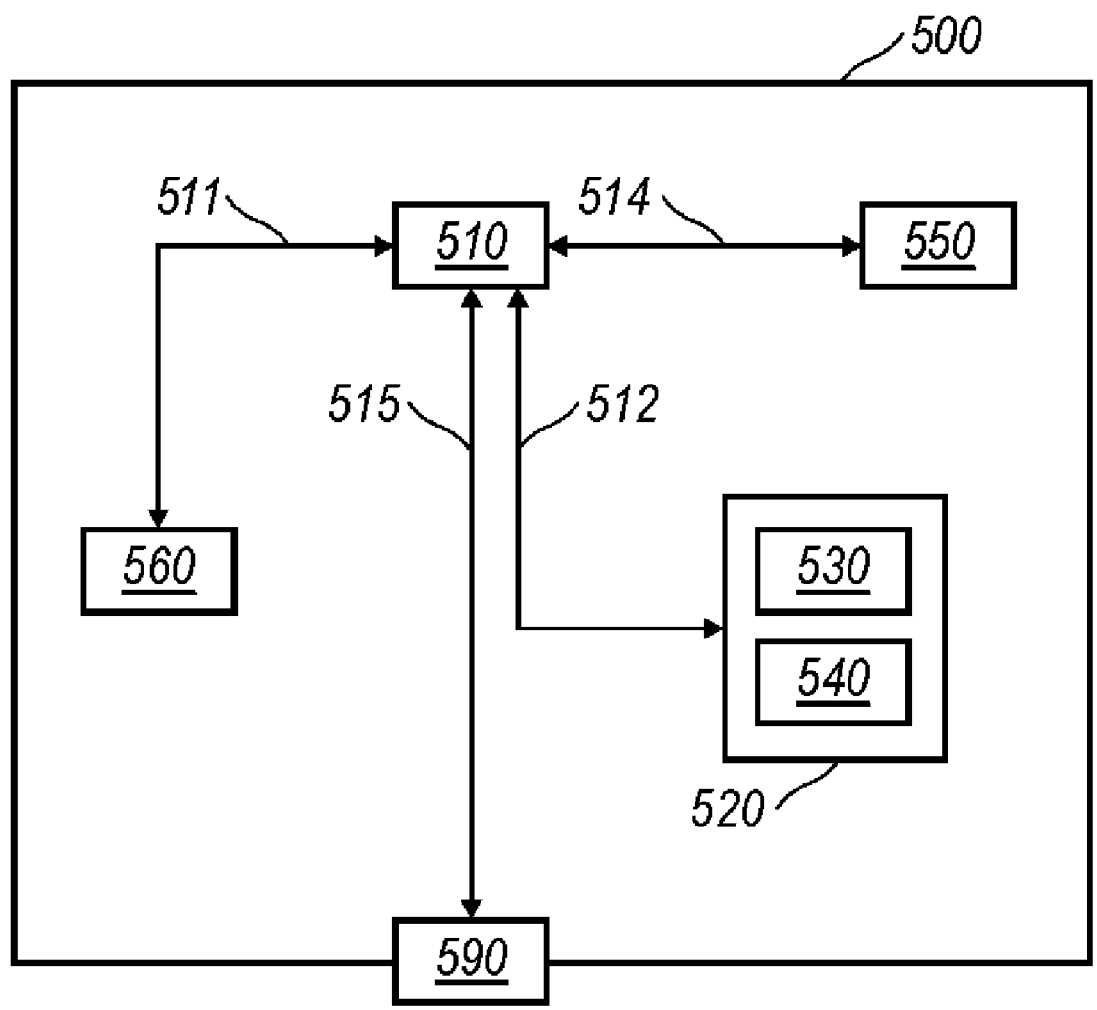
FIG. 3 shows an apparatus that is used according to an embodiment of the invention.

However, the change of mode is commenced earlier than according to known technology. In an additional alternative embodiment, the requisite adjustments for the change of mode can be commenced during said period of time and can be completed immediately after said period of time; that is, if necessary, during the transient. Thus the control of the opening/closing of the valves can be carried out gradually over a relatively long period of time or instantaneously which should be taken to mean in a relatively short period of time. FIG. 3 shows an apparatus 500 that is configured according to an embodiment of the invention and which comprises a non-volatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be comprised in, for example, a control unit, such as the control unit 3. The data-processing unit 510 can comprise, for example, a microcomputer.

The memory 520 also has a second memory part 540, in which a program for controlling the valve timing according to the invention is stored. In an alternative embodiment, the program for controlling the valve timing is stored in a separate non-volatile data-storage medium 550, such as, for example, a CD or a plug-in semiconductor memory. The program can be stored in an executable form or in a compressed state.

When it is described in the following that the data processing unit 510 executes a special function, it should be clear that the data processing unit 510 executes a special part of the program which is stored in the memory 540 or a special part of the program which is stored on the non-volatile recording medium 550.

The data processing unit 510 is arranged to communicate with the memory 550 by means of a databus 514. The data processing unit 510 is also arranged to communicate with the memory 520 by means of a databus 512. In addition, the data processing unit 510 is arranged to communicate with the memory 560 by means of a databus 511. The data processing unit 510 is also arranged to communicate with a data port 590 by means of a databus 515.

The method according to the present invention can be carried out by the data processing unit 510 by means of the data processing unit 510 executing the program which is stored in the memory 540 or the program which is stored on the non-volatile recording medium 550.

What is claimed is:

1. A vehicle with a combustion engine (1), that has at least an inlet valve (7) and at least an exhaust valve (8) on each combustion chamber, at least one of which has operating devices (9,10) for controlling at least one of an opening time and a lift height of the valves, and electronic controlling devices (3) that control said operating devices, characterized in that the controlling devices (3) are arranged to calculate future resistance to forward motion and a period of time to a future transient in an engine's operating condition, while the vehicle is being driven, with the aid of entered information about at least the gradient of the road and a throttle position, and to control said operating devices (9,10) during said period of time for increased level of optimization of the engine's performance, when the transient arises.

2. The vehicle as recited in claim 1, wherein the combustion engine (1) is supercharged and the vehicle includes an automatic transmission (2) that is driven by the engine, wherein the controlling devices (3) have engine and transmission control functions and are arranged to calculate the period of time to a future gear change and to control said operating devices (9,10) during this period, so that said adjustments of valve timing or valve lift height are carried out at least in order to optimize the gear changes.

3. The vehicle as recited in claim 1, further comprising a computer program executed by a computer and including program code for carrying out a control method in the vehicle that further comprises at least one of the inlet (7) and exhaust (8) valves has one of variable valve timing and valve lift height, for regulating said valve timing or valve lift height while the vehicle is being driven, characterized in that the vehicle's future resistance to forward motion is calculated, the period of time until the future transient in the engine's operating condition is calculated and requisite adjustments of said valve timing or valve lift height are at least commenced during this period of time for increased level of optimization of the engine's performance, when the transient arises.

4. The vehicle as recited in claim 1, further comprising a computer program product comprising program code stored on a medium that can be read by a computer for carrying out a control method in the vehicle that further comprises at least one of the inlet (7) and exhaust (8) valves has one of variable valve timing and valve lift height, for regulating said valve timing or valve lift height while the vehicle is being driven, characterized in that the vehicle's future resistance to forward motion is calculated, the period of time until the future transient in the engine's operating condition is calculated and requisite adjustments of said valve timing or valve lift height are at least commenced during this period of time for increased level of optimization of the engine's performance, when the transient arises.

5. The vehicle as recited in claim 1, further comprising a computer program product that can be loaded directly into an internal memory in a computer, which computer program product comprises a computer program for carrying out a control method in the vehicle that further comprises at least one of the inlet (7) and exhaust (8) valves has one of variable valve timing and valve lift height, for regulating said valve timing or valve lift height while the vehicle is being driven, characterized in that the vehicle's future resistance to forward motion is calculated, the period of time until the future transient in the engine's operating condition is calculated and requisite adjustments of said valve timing or valve lift height are at least commenced during this period of time for increased level of optimization of the engine's performance, when the transient arises.

6. A method conducted in a vehicle including a combustion engine with multiple combustion chambers with which at least one inlet valve and at least one exhaust valve is associated, at least one of said inlet and exhaust valves having at least one of (1) variable valve timing and (2) variable valve lift height, said method comprising:
- regulating said valve timing or valve lift height while the vehicle is being driven;
- calculating a future resistance of the vehicle to forward motion;
- calculating a period of time until a future transient in an engine's operating condition will occur; and
- adjusting said valve timing or valve lift height prior to the occurrence of the future transient and thereby improving the engine's performance during the period when the transient arises.

7. The method as recited in claim 6, wherein said adjustment of said valve timing or valve lift height is concluded before the period when the transient arises.

8. The method as recited in claim 6, wherein said adjustment of said valve timing or valve lift height bring about a change in engine operating mode.

9. The method as recited in claim 8, wherein said adjustment of said valve timing or valve lift height is concluded sufficiently early to assure that said change of engine operating mode is completed before the transient arises.

10. The method as recited in claim 6, wherein said adjustment of said valve timing or valve lift height (1) is made in association with changing gear in an automatic transmission which is connected to the combustion engine which has a compression braking device arranged to be activated automatically when the automatic transmission upshifts and (2) optimizes the upshift using the compression braking device as an engine speed controller.

11. The method as recited in claim 6, wherein said adjustment of said valve timing or valve lift height is carried out gradually over a relatively long time.

12. The method as recited in claim 6, wherein said adjustment of said valve timing or valve lift height is carried out instantaneously over a relatively short time.

13. A vehicle optimized to minimize negative effects of transient characteristics, said vehicle comprising:
- a combustion engine including a plurality of combustion chambers, each of said combustion chambers having at least one inlet valve and at least one exhaust valve associated therewith;
- at least one operating device that controls at least one of (1) the opening time and (2) the lift height of the valves; and
- an electronic controlling device that controls said operating devices, said electronic controlling device being adapted to calculate future resistance to forward motion and a period of time to a future transient in an engine's operating condition while the vehicle is being driven with the aid of entered information about at least the gradient of the road and a throttle position, and to control said operating devices during said period of time for increased optimization of the engine's performance when the transient arises.

14. The vehicle as recited in claim 13, further comprising:
- a supercharger associated the combustion engine and an automatic transmission driven by the engine; and
- said controlling device having engine and transmission control functions and being configured to calculate a period of time to a future gear change and to control said operating devices so that said adjustments of valve timing or valve lift height are carried out at least in order to optimize the gear changes.

15. A method for optimizing the performance of a combustion engine of a driven vehicle, wherein the combustion engine has at least one combustion chamber including at least an inlet valve and at least an exhaust valve, at least one of the at least an inlet valve and the at least an exhaust valve having at least one of variable valve timing and variable valve lift height, the method comprising:
- calculating a future resistance of the vehicle to forward motion;
- calculating a time period until a future transient occurs in an engine's operating condition; and
- adjusting at least one of the variable valve timing and the variable valve lift height during the time period to provide optimum engine performance when the transient arises.

16. The method as recited in claim 15, wherein the adjusting at least one of the variable valve timing and the variable valve lift height is carried out instantaneously over a relatively short time within the time period.

17. The method as recited in claim 15, wherein the adjusting at least one of the variable valve timing and the variable valve lift height also concludes during the time period.

18. The method as recited in claim 15, wherein the adjusting at least one of the variable valve timing and the variable valve lift height brings about a change in an operating mode of the combustion engine.

19. The method as recited in claim 18, wherein the change in the operating mode of the combustion engine commences before the end of the time period, so that the change in the operating mode is complete before the time period ends and before the transient arises.

20. The method as recited in claim 15, wherein the combustion engine further includes a compression braking device arranged to be activated automatically with changing up of a gear of an automatic transmission, and wherein adjusting at least one of the variable valve timing and the variable valve lift height optimizes the changing up of the gear with the compression brake as a speed controller for the combustion engine.

21. The method as recited in claim 15, wherein the adjusting at least one of the variable valve timing and the variable valve lift height is carried out gradually over a relatively long time within the time period.

* * * * *